US011467644B2

(12) United States Patent
Tan et al.

(10) Patent No.: US 11,467,644 B2
(45) Date of Patent: Oct. 11, 2022

(54) SYSTEMS AND METHODS FOR DETECTING BATTERY REMOVAL WHILE AN INFORMATION HANDLING SYSTEM IS IN AN OFF STATE

(71) Applicant: Dell Products, LP, Round Rock, TX (US)

(72) Inventors: Geroncio O. Tan, Austin, TX (US); Chia-Liang Lin, Taipei (TW); Jui Chin Fang, Wenshan District (TW); Chia-Fa Chang, Linkou Township (TW); Timothy C. Shaw, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 160 days.

(21) Appl. No.: 16/864,933

(22) Filed: May 1, 2020

(65) Prior Publication Data

US 2021/0341983 A1 Nov. 4, 2021

(51) Int. Cl.
*G06F 1/28* (2006.01)
*G06F 21/62* (2013.01)
*H02J 7/00* (2006.01)
*H04L 9/08* (2006.01)
*G06F 21/73* (2013.01)

(52) U.S. Cl.
CPC ............ *G06F 1/28* (2013.01); *G06F 21/62* (2013.01); *G06F 21/73* (2013.01); *H02J 7/0047* (2013.01); *H02J 7/0063* (2013.01); *H04L 9/0866* (2013.01)

(58) Field of Classification Search
CPC . G06F 1/28; G06F 21/62; G06F 21/73; G06F 21/81; H02J 7/0047; H02J 7/0063; H02J 7/00034; H04L 9/0866
See application file for complete search history.

(56) References Cited

U.S. PATENT DOCUMENTS

| 6,208,114 B1 * | 3/2001 | Jones | G01R 31/3648 320/107 |
| 10,878,207 B1 * | 12/2020 | Tran | G06K 7/10366 |
| 2009/0100282 A1 * | 4/2009 | Groff | G06F 1/28 713/340 |
| 2010/0194348 A1 * | 8/2010 | Wang | H01M 10/48 320/136 |

(Continued)

*Primary Examiner* — Danny Chan
(74) *Attorney, Agent, or Firm* — Prol Intellectual Property Law, PLLC; H. Kenneth Prol

(57) ABSTRACT

An information handling system may include a processor; a battery to supply power to the information handling system, the battery comprising a voltage regulator to power a battery management unit (BMU) on the battery and set a system present pin of the BMU to a high voltage; the BMU to: detect a voltage indicator indicating a change in voltage state at a system present pin of the BMU that is externally connectable to a ground or voltage source at the information handling system, the voltage indicator indicative of an electrical coupling of the battery to the information handling system while the information handling system is in an off state; and register the voltage indicator within a battery register of the BMU; and a microcontroller, upon powering on of the information handling system, to read the voltage indicator at the battery register and determine that the battery has been coupled to the information handling system.

20 Claims, 7 Drawing Sheets

(56) References Cited

U.S. PATENT DOCUMENTS

| | | | |
|---|---|---|---|
| 2013/0086372 A1* | 4/2013 | Kojo | G06F 1/24 713/2 |
| 2013/0111251 A1* | 5/2013 | Leinonen | G06F 1/26 713/340 |
| 2015/0189168 A1* | 7/2015 | Tanaka | H04N 5/23241 348/231.6 |
| 2018/0005207 A1* | 1/2018 | Wade | G07G 1/0018 |
| 2018/0246552 A1* | 8/2018 | Thompson | G06F 11/3093 |
| 2021/0034452 A1* | 2/2021 | Tan | G06F 9/4401 |
| 2021/0044433 A1* | 2/2021 | Hay | G06F 9/45558 |
| 2021/0225159 A1* | 7/2021 | Grobelny | G08B 29/16 |

* cited by examiner

SYSTEMS AND METHODS FOR DETECTING BATTERY REMOVAL WHILE AN INFORMATION HANDLING SYSTEM IS IN AN OFF STATE

FIELD OF THE DISCLOSURE

The present disclosure generally relates to battery removal detection at an information handling system. The present disclosure more specifically relates to battery removal detection at an information handling system while the information handling system is in an off state.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include a battery for supplying power to the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
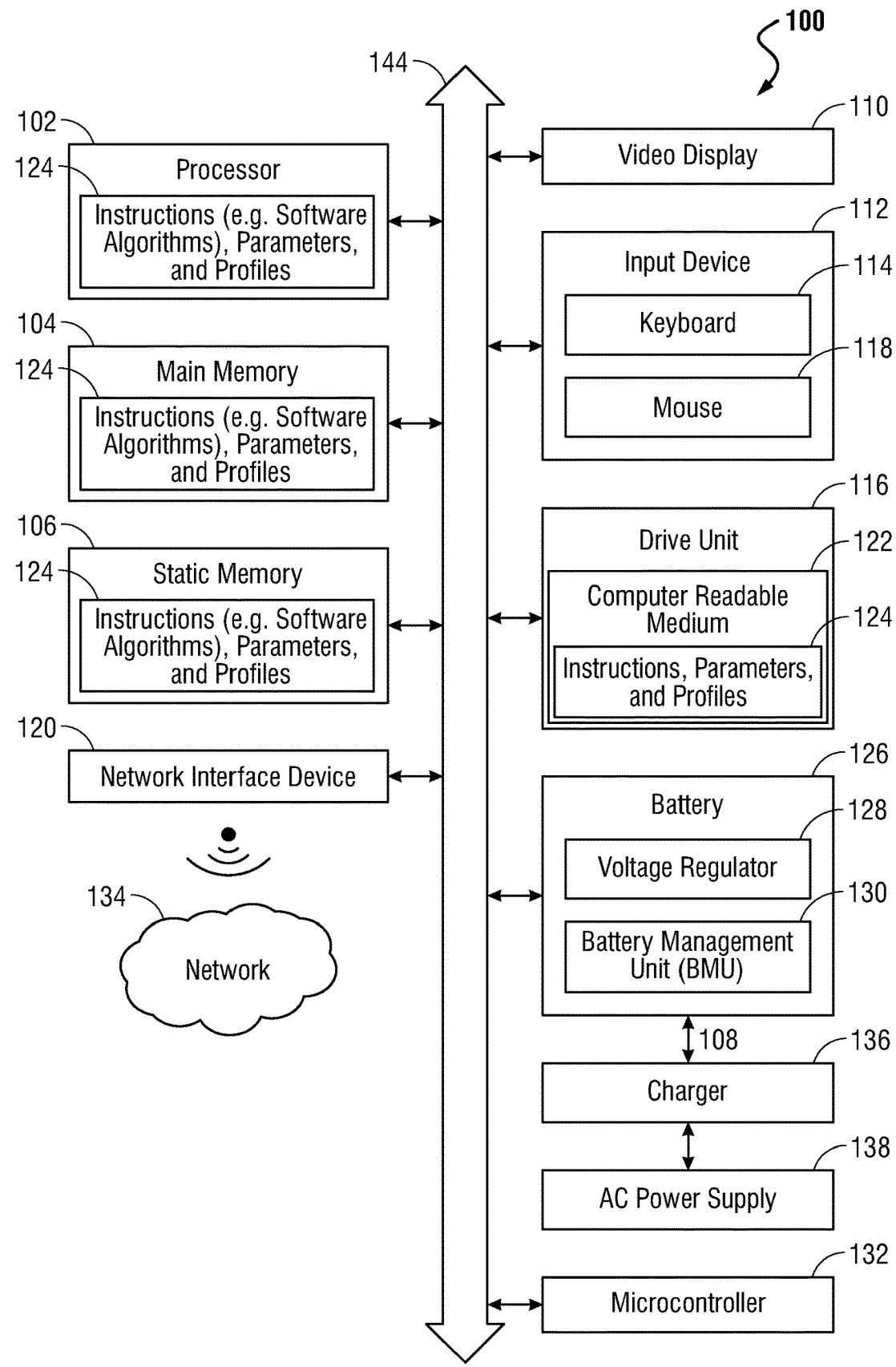
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Embodiments of the present disclosure provide for a system and method to detect the removal of a battery or battery pack of an information handling system as the information handling system is in an "off state." In some embodiments described herein, the term "off state" is meant to describe a electrical and mechanical state of an information handling system where power provided to the information handling system by the battery and other power has been completely removed from the information handling system via a mechanical switch or electronically. In an embodiment, the "off state" may be equivalent to a G3 state according to the advanced configuration and power interface (ACPI) standards.

The system and method may also take one or more of a plurality of preset actions in order to protect the information handling system from certain security risks associated with physically and electrically separating the battery from the information handling system. Embodiments of the present disclosure provide for an information handling system that includes a processor; and a battery system to supply power to the information handling system. In an embodiment, the battery system may include a voltage regulator to power a battery management unit (BMU) on the battery. In the embodiments presented herein, a system present pin (SYS_PRES # in) may be set to a first voltage state. During either a removal of the battery from the information handling system or the coupling of the battery to the information handling system, the first voltage state may be changed to a second voltage state. At this time, the BMU may detect this voltage indicator descriptive of the first voltage state being changed to the second voltage state and register that voltage indicator on a battery register. For ease of understanding and for convenience in description, the examples presented herein may refer to the first voltage state as being a high voltage while the second voltage state is a relatively low voltage compared to the high voltage. Other examples are contemplated such as the first voltage state being a low voltage as compared to a second voltage state being a relatively higher voltage. Still further, in some examples, the first voltage state may be a first predetermined voltage while the second voltage state is a second, different, predetermined voltage. According to the present specification, the system present pin may undergo a voltage change in order for the voltage indicator to be created and stored by the BMU on a battery register. In the embodiments presented herein, the high or low voltage set at the system present pin of the BMU may be set by any type of device including, but not limited to, any of the BMU, a voltage regulator within the battery or another circuit within the information handling system.

In a specific example, the BMU may detect a voltage indicator indicating a high-to-low voltage drop at system present pin (e.g., SYS_PRES #) of the BMU that is externally connectable to a ground at the information handling system, the voltage indicator indicative of this electrical coupling of the battery to the information handling system while, in an embodiment, the information handling system is in an off state. The battery management unit (BMU) may register the voltage indicator within a battery register associated with the BMU. In an embodiment, the information handling system may include a microcontroller to read the voltage indicator and reset the battery register to erase the voltage indicator after the information handling system has been turned on.

In addition to providing a voltage indicator, indicative of an electrical coupling of the battery to the information handling system while the information handling system is in an off state, in some embodiments, the microcontroller of the information handling system may, upon reading the voltage indicator, cause a warning message to be displayed on a display device of the information handling system indicating to a user that the battery has been removed since the information handling system has been placed in the off state. Additionally, or alternatively, the microcontroller of the information handling system may, upon reading the voltage indicator, increases security requirements at the information handling system in order to allow access to contents of a system drive on the information handling system. Additionally, or alternatively, the microcontroller of the information handling system may, upon reading the voltage indicator, implements a customized security process according to a security administrator setting. In some embodiments, the microcontroller may read a serial number of the battery maintained by the BMU to confirm the authenticity of the battery. In some embodiments, the microcontroller may decrypt an encrypted battery serial number maintained by the BMU using a public key to confirm that security parameters maintained on the BMU are to be copied and applied at the information handling system.

Embodiments of the present disclosure provide for a method of detecting a removal of a battery pack. The method may include, at a voltage regulator within the battery pack, detecting a voltage indicator indicating a high-to-low voltage drop at a power supply line to the processor indicative of an electrical coupling of the battery to the information handling system. In some embodiments, this may be done while the information handling system is in an off state. The method may also include, at a battery management unit (BMU) receiving the voltage indicator and processing the voltage indicator to register the voltage indicator within a battery register within the battery pack. The method may also include, with a microcontroller of an information handling system, reading the voltage indicator and resetting the battery register to erase the voltage indicator.

The systems and methods described herein may be used to provide for a system that may perform certain preset actions in response to the detection of the battery being removed. These preset actions may increase the security of the data maintained on the information handling system, increase the security of the hardware of the information handling system, and increase the ability to diagnose any technical issues associated with the information handling system upon power on of the information handling system. In some specific embodiments, the systems and methods described herein may detect the use of a different battery at the information handling system that may have been swapped out for a non-original equipment manufacturer (OEM) battery which may impact the operation of the information handling system. Still further, the systems and methods may deter any intrusions into the chassis by limiting access to the data on the information handling system if the battery was removed when the information handling system is off indicative of a potential intrusion into the chassis of the information handling system.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a convertible laptop computer, a desktop computer, a communications device, an access point (AP), a base station transceiver, a wireless telephone, a land-line telephone, a control system, a camera, a scanner, a facsimile machine, a printer, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system 100 can include one or more storage devices, one or more communications ports for communicating with external devices, as well as, various input and output (I/O) devices, such as a keyboard, a mouse, a video/graphic display, or any combination thereof. The information handling system 100 can also include one or more buses operable to transmit communications between the various hardware components. Portions of an information handling system 100 may themselves be considered information handling systems 100.

Information handling system 100 can include devices or modules that embody one or more of the devices or execute instructions for the one or more systems and modules described herein, and operates to perform one or more of the methods described herein. The information handling system 100 may execute code instructions 124 (e.g., software algorithms) that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the microcontroller 132, and drive unit 116 (volatile (e.g. random-access memory, etc.), nonvolatile (read-only memory, flash memory etc.) or any combination thereof). The information handling system 100 can also include one or more buses 144 operable to transmit communications between the various hardware components such as any combination of various input and output (I/O) devices 112 (e.g., video display 110, keyboard 114, battery 126, BMU 130, and mouse 118).

The information handling system 100 may further include a video display 110. The video display 110 in an embodiment may function as a liquid crystal display (LCD), an organic light emitting diode (OLED), a flat panel display, or a solid-state display. Additionally, the information handling system 100 may include an input device 112, such as a cursor control device (e.g., mouse 118, touchpad, or gesture or touch screen input, and a keyboard 114). The information handling system 100 can also include a disk drive unit 116.

The network interface device 120 may be a wireless adapter that may provide connectivity to a network 134, e.g., a wide area network (WAN), a local area network (LAN), wireless local area network (WLAN), a wireless personal area network (WPAN), a wireless wide area network (WWAN), or other networks. Connectivity may be via wired or wireless connection. In this embodiment, the wireless adapter may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. In some aspects of the present disclosure, one wireless adapter 120 may operate two or more wireless links.

In an embodiment, the wireless adapter may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both licensed and unlicensed spectrums.

In some embodiments, software, firmware, dedicated hardware implementations such as application specific integrated circuits, programmable logic arrays and other hardware devices can be constructed to implement one or more of some systems and methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions, parameters, and profiles 124 or receives and executes instructions, parameters, and profiles 124 responsive to a propagated signal, so that a device connected to a network 134 can communicate voice, video or data over the network 134. Further, the instructions 124 may be transmitted or received over the network 134 via the network interface device or wireless adapter 120.

The information handling system 100 can include a set of instructions 124 that can be executed to cause the computer system to perform any one or more of the methods or computer-based functions disclosed herein. For example, instructions 124 may be executed on a microcontroller 132 and BMU 130, and execute software agents, or other aspects or components. Various software modules comprising application instructions 124 may be coordinated by an operating system (OS), and/or via an application programming interface (API). An example operating system may include Windows®, Android®, and other OS types. Example APIs may include Win 32, Core Java API, or Android APIs.

The disk drive unit 116 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124. The disk drive unit 116 and static memory 106 may also contain space for data storage. Further, the instructions 124 may embody one or more of the methods or logic as described herein. For example, instructions relating to the software algorithms, processes, and/or methods executed by the microcontroller 132 and/or other processor 102 may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the instructions relating to the software algorithms, processes, and/or methods executed by the microcontroller 132 may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The instructions relating to the software algorithms, processes, and/or methods executed by the microcontroller 132 may be stored in static memory 106, or the drive unit 116 on a computer-readable medium 122 such as a flash memory or magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100, as described herein, may also include a microcontroller 132 and battery 126 that may be operably connected to the bus 144. In the embodiments described herein, upon power being provided to the information handling system 100 by actuation, for example, of a mechanical switch, the microcontroller 132 may interact with a battery management unit (BMU) 130 of the battery 126. This interaction may, according to the present description, perform tasks related to reading a voltage indicator maintained on the BMU 130 and resetting a battery register of the BMU 130 to erase the voltage indicator. In a specific embodiment, the BMU 130 may coordinate with a power management unit within the information handling system 100 to manage the charging of the battery, manage sleep states of the information handling system 100, manage thermal control systems, and provides warnings to a user if and when currents spike within the information handling system 100. The power management system of the information handling system may control other systems within the information handling system such as voltage scaling, power source selection, power sequencing, and DC to DC conversion among other tasks. The present specification contemplates these functions of the power management unit within the information handling system 100. In this embodiment, the power management unit may form part of the microcontroller 132 (e.g., an embedded controller).

During operation of the information handling system 100, the BMU 130 may monitor for power source inputs, manage the operation of the alternating current (A/C) power source(s), manage battery functions described herein, manage charging of any battery cells within the battery, manage power consumption by the information handling system 100, and manage power saving systems, among other functions. Additionally, during operation of the information handling system 100, power may be removed from the components of the information handling system 100 via actuation of a mechanical off switch thereby placing the information handling system 100 in an off state. While in the off state, the voltage regulator 128 of the battery 126 of the information handling system 100 may provide power to the BMU 130. This power may be provided continuously in an embodiment. The battery 126 may also provide power to any other component within the battery 126 that are communicatively coupled to the BMU 130. The amount of power provided to and consumed by the BMU 130 may be sufficient to allow the BMU 130 to be continuously powered for a number of hours while the information handling system 100 is in this off state.

While power is being provided to the BMU 130, the voltage regulator 128 may maintain a high voltage at a system present pin (e.g., SYS_PRES #) of the BMU 130. The high voltage may be, in an embodiment, a voltage greater than ground. While the system present pin of the BMU 130 is set to a first voltage state, such as a high voltage in one example, the BMU 130 may detect that the battery 126 is detached from the information handling system 100. In other embodiments, the detached battery 126 may yield a detected low voltage state by the BMU 130. When the battery 126 is attached to the information handling system 100, the system present pin of the BMU 130 may be set to transition to a second voltage state, in an example, a low voltage. In other embodiments, the attached battery may transition to a high voltage state. The BMU 130 detects this high-to-low voltage drop (low-to-high transition, or other voltage transition) at the system present pin when the system present pin is electrically coupled to a ground source within the information handling system 100. During operation of the information handlings system, when the battery 126 is attached while the information handling system 100 is in an off state, the system present pin of the BMU 130 may remain in a first transition voltage state until, in some examples, the battery is removed from the information handling system 100, hence breaking it ground connection to the information handling system 100 and the system present pin voltage transition from low back to high. The system present state shall remain high until the battery is reinserted back into the system. In some embodiments, the transition in voltage state, such as a drop in voltage from a high voltage to a low voltage, may cause the BMU 130 to create a voltage indicator that is indicative of this electrical coupling of the battery 126 to the ground of the information handling system 100. This electrical coupling of the battery 126 to the ground of the information handlings system 100 may be accompanied with a mechanical coupling of the battery to the chassis or other structure of the information handling system 100 and electrical coupling of the battery 126 to the information handling system 100. For example, battery 126 may be electrically coupled to charger 136 and other systems including a microcontroller 132 as well as a ground or voltage source such as an RTC voltage source in some example embodiments.

Upon creation of the voltage indicator by the BMU 130, the BMU 130 may cause the voltage indicator to be stored, for example, within a battery register (e.g., BATT_DISC register) for later retrieval by a microcontroller 132 within the chassis of the information handling system 100. In an embodiment, the voltage indicator generated by a voltage state transition (e.g., high to low, or low to high) may be stored by changing a bit within the battery register from a "0" to a "1." Other storage methods of the voltage indicator may be used and the present specification contemplates these other storage methods.

When the information handling system 100 is powered back on, the microcontroller 132 may read the battery register of the BMU 130. If and when the voltage indicator is discovered to exist on the battery register, the microcontroller 132 may initiate certain preset actions in order to protect the information handling system 100 and the data maintained thereon. By initiating these preset actions described herein, the user may be assured that the removal of the battery 126 from the information handling system 100, while the information handling system 100 was in an off state, was not done to, for example, circumvent any chassis intrusion detection devices or circuits while the power was off at that information handling system 100 and to confirm that the security of the information handling system 100 has not been compromised. Other reasons to initiate the methods conducted by the BMU 130, voltage regulator 128, and microcontroller 132 are also contemplated in the present specification.

As described herein, the microcontroller 132 reads the voltage indicator stored by the BMU 130 on a battery registry and, after engaging the information handling system 100 to initiate a preset action, may reset this battery register to erase the voltage indicator. The preset action may, in some embodiments, be designated by an information technology (IT) manager or by the user prior to the information handling system 100 being placed in an off state or at some time prior to the removal of the battery 126 from the information handling system 100 while the information handling system 100 is in the off state.

By way of example, the preset action conducted by the microcontroller 132 upon detection of the voltage indicator at the BMU 130 may include causing a warning message to be displayed on the video display 110 of the information handling system 100 indicating to a user that the battery 126 has been removed since the information handling system 100 has been placed in the off state. In an effort to eliminate a button cell or other battery from and to save costs and space on the printed circuit boards within the information handling system 100, a voltage regulator 128 such as a low dropout regulator within the battery 126 may be routed out to the information handling system 100 to be used as an alternative source to power a real time clock (RTC) rail within the information handling system 100. In the event where the battery 126 is decoupled from the information handling system 100 (e.g., for system hardware/software/ firmware upgrades), the RTC rail will be disconnected as well. As a result, during a subsequent powering on of the information handling system 100, the time used to boot a BIOS or OS may take significantly more time than normal due to sequential re-initializations of a management engine (ME) associated with a processor such as the processor 102 within the information handling system 100. To avoid any confusion by the user as a result of these multiple re-initializations of the ME, at startup, an embedded controller such as the microcontroller 132 of the information handling system 100 may configure a timing controller (TCON) to display this warning message to the user. This warning message may be presented upon detection of the voltage indicator as described herein. This warning message may include any detail related to the consequences related to the removal of the battery 126 such as warnings that the boot time may take longer or cautions related to the potential compromising of the data maintained on the information handling system 100. In an example, the warning presented to the user on the video display 110 may include instructions related to contacting their IT manager and may require some additional credentials in order to allow the boot process of a basic input/output system (BIOS) or operating system (OS) to be executed by the processor 102 of the information handling system 100.

By way of example, the preset action conducted by the microcontroller 132 upon detection of the voltage indicator at the BMU 130 may include implementing a customized security process according to a security administrator setting as briefly mentioned. Malicious hackers may try to reset the security parameters of the information handling system 100 by resetting power to the information handling system 100. By detecting if and when the battery 126 has been removed, the information handling system 100 may disable access to certain security features temporarily, invoke the re-authentication process, and/or otherwise increase security measures. In an embodiment, these security measures may include sending a confirmation to an IT administrator to notify the IT administrator that the microcontroller 132 has detected the voltage indicator at the BMU 130. In an embodiment, the microcontroller 132 may present a graphical user interface at the video display 110 requesting a password or passcode that is known only to the IT administrator thereby creating an additional level of security prior to the user gaining access to the information handling system 100. Other additional security measures may be instituted by an IT manager that prevent unauthorized access to data maintained on the information handling system 100 and the present specification contemplates these other security measures and settings without going beyond the scope of the principles described herein.

By way of example, the preset action conducted by the microcontroller 132 upon detection of the voltage indicator at the BMU 130 may include reading a serial number of the battery maintained by the BMU to confirm the authenticity of the battery. In this embodiment, the serial number may verify to the microcontroller 132 that the battery 126 is either the original battery associated with the information handling system 100 or a new battery that has been made by an original equipment manufacturer (OEM) and is certified to be used with the information handling system 100. In an embodiment, where the microcontroller 132 does not recognize or otherwise executes computer usable program code that indicates that the serial number associated with the battery 126 is not the original or OEM manufactured, the microcontroller 132 may store data descriptive of the use of a non-OEM battery. This data may be referred to by a service provider or other entity to verify warranty qualifications associated with the use of the information handling system 100.

By way of example, the preset action conducted by the microcontroller 132 upon detection of the voltage indicator at the BMU 130 may include decrypting encrypted security parameters maintained by the BMU after binding a serial number associated with the battery to a binding key associated with the information handling system and accessing the security parameters. In this embodiment, the security parameters may include computer executable program code that, when executed by the microcontroller 132, provides for increased security related to accessing data on the information handling system 100. The security parameters may include computer executable program code that, when executed by the microcontroller 132 or processor 102, may implement any type of additional or supplementary security measures above those that may be conducted by the information handling system 100 during, for example, a booting process of the BIOS or OS. Again, as described herein, although specific examples are described herein, the present specification contemplates that any IT manager- or user-created security measures may be implemented in order to increase the security. In an embodiment, as part of the decrypted security parameters, a warning may be presented to the user on the video display 110 may include instructions related to contacting their IT manager and may require some additional credentials in order to allow the boot process of a basic input/output system (BIOS) or operating system (OS) to be executed by the processor 102 of the information handling system 100. In an example, the security parameters may include computer readable program code that, when executed by the microcontroller 132, causes all or a portion of a storage device on the information handling system 100 to be erased. In this embodiment, the storage devices may include the drive unit 116, the main memory 104, and/or the static memory 106 as well as any cache data or other data maintained on any other volatile or non-volatile memory devices.

In an embodiment, the microcontroller 132 and BMU 130 of the battery 126 may communicate with the main memory 104, the processor 102, the video display 110, the alphanumeric input device 112, and the network interface device 120 via bus 144, and several forms of communication may be used, including ACPI, SMBus, a 24 MHZ BFSK-coded transmission channel, or shared memory. Driver software for a keyboard, other input/output (I/O) devices, or other systems, firmware, controllers and the like may communicate with applications on the information handling system 100.

In an embodiment, the battery 126 may be electrically coupled to a charger 136 via a charging line 108. The charger 136 may regulate the amount of power provided to the battery in order to charge the battery if and when any of the cells within the battery 126 have been depleted. In order to do so, the charger 136 may be electrically coupled to an alternating current (AC) supply 138. In an embodiment, the charger 136 and AC power supply 138 may be provided via circuitry present in the information handling system 100. In another embodiment, the charger may be a stand-alone device separate from the information handling system 100 that is coupled to an AC power supply 138 such as a power outlet.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. In an embodiment an information handling system 100 may include an integrated circuit or a board-level product having portions thereof that can also be any combination of hardware and software such as the voltage regulator 128 and the BMU 130 with the microcontroller 132. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
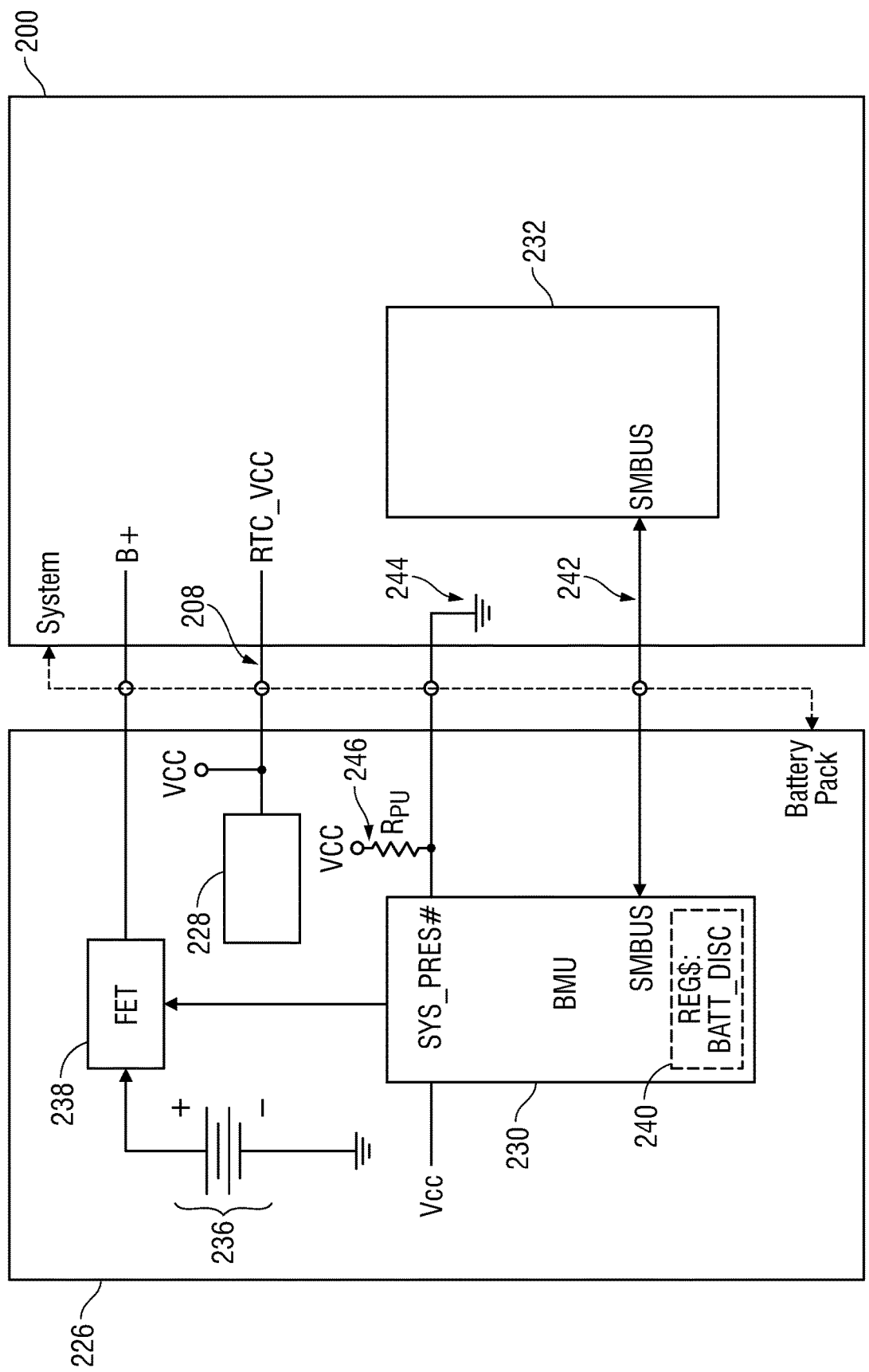
FIG. 2 is a circuit diagram of an information handling system and a battery system according to an embodiment of the present disclosure.

FIG. 2 is a circuit diagram of an information handling system 200 and a battery 226 according to an embodiment of the present disclosure. Although the circuit diagram of FIG. 2 shows specific orientation of certain components of the battery 226 and information handling system 200 relative to each other, the present specification contemplates that other arrangements and the inclusion of other circuitry may be present on the battery 226 and information handling system 200 without going beyond the scope of the principles described herein.

As described herein, the battery 226 may be selectively removed from the information handling system 200 to, for example, to complete hardware, software, or firmware upgrades. However, malicious hackers may also try to reset the security parameters of the information handling system 200 by removing the battery 226 from the information handling system 200 and resetting power to the information handling system 200. By detecting if and when the battery 226 has been removed, the information handling system 200 may limit certain security access temporarily, invoke the re-authentication process, and/or otherwise increase security measures by engaging in the preset actions as described herein. This process may be completed while the information handling system 100 is powered on. The present specification describes how the battery 226 detects the recoupling of the battery 226 from the information handling system 200 while the information handling system is off.

The battery 226 may include circuitry used to provide power to the information handling system 200. During operation of the information handling system 200, for example, the BMU 230 may monitor for power source inputs, manage the operation of the alternating current (A/C) power source(s), manage battery functions described herein, manage charging of any battery cells within the battery, manage power consumption by the information handling system 200, and manage power saving systems, among other functions.

Among the circuitry in the battery 226 is one or more battery cell 236 in x-series and y-parallel topology with a battery terminal that provides power to a FET 238. The FET 238 may be used by the battery 226, and specifically the BMU 230, to control the flow of charge/discharge current from, for example, cells 236 within the battery 226 to the BMU 230, the voltage regulator 228, and the other components of the information handling system 200. In the embodiments described herein, the FET 238 may be communicatively coupled to a power supply rail within the information handling system 200 to provide power to the information handling system 200. The battery cells 236 may be any type of battery storage system known and used in the art with information handling systems including lithium ion batteries, lithium polymer batteries, nickel-cadmium batteries, nickel metal hydride, or other battery cell types.

The battery 226 may further include a voltage regulator 228 such as a linear drop-out (LDO) voltage regulator. As described herein, the voltage regulator 228 may provide power to a real-time clock (RTC) within the information handling while the battery 226 is electrically coupled to the information handling system 200. Additionally, in some embodiments, the voltage regulator 228 may provide power ($V_{cc}$) to the BMU 230 at all times and while the battery 226 is physically and electrically decoupled from the information handling system 200. The power provided to the BMU 230 is done so that the BMU 230 may detect when the battery 226 has been coupled to the information handling system 200 after the battery 226 had previously been removed. The BMU 230 detects when the battery 226 has been coupled to the information handling system and is now providing power (B+) via the power supply line. Further, the voltage regulator 228 may provide real time clock (RTC) power via line 208. Further, the voltage state at the SYS_PRES # pin (system present pin) changes when coupling occurs. In a specific example the change in voltage may be a transition from a high voltage to a low voltage, from a low voltage to a high voltage, or from a first voltage to a different second voltage. In the shown embodiment, the voltage would be a high to low transition. When decoupled, the SYS_PRES # pin of BMU 230 is pulled high by $V_{cc}$ and pull up resistor $R_{PU}$ 246. Upon coupling of battery 226 to information handling system 200, the SYS_PRES # pin of BMU 230 is attached to ground 244 and drawn to a low voltage state. $R_{PU}$ 246 prevents the voltage source $V_{cc}$ from shorting to ground. Further, upon coupling of the battery 226 to information handling system 200 coupled microcontroller 232 to BMU 230 via bus 242.

By way of example, the change in voltage at the SYS_PRES # pin may be detected as the SYS_PRES # pin is electrically coupled to a ground source 244 within the information handling system 200. While the battery 226 remains attached to the information handling system 100, the system present pin may remain unchanged at, for example, a low voltage level (e.g., a first voltage state). When the battery 226 is removed from the information handling system 200, the SYS_PRES # pin may be placed at a high-voltage state as pulled up to $V_{cc}$ via pull up resistor $R_{PU}$ 246 while the BMU 230 is continuously powered via the voltage regulator 228. Because the SYS_PRES # pin of the BMU 230 is no longer connected to the grounding source 244 of the information handling system 200 once the battery 226 has been removed, the BMU 230 may set the voltage to this high state while also providing power to operate the BMU 230. In an embodiment, the SYS_PRES # pin may be set to this high voltage state using a dedicated Vcc source $V_{CC}$. At this point, the BMU 230 may monitor for a drop in voltage or other change in voltage state at the SYS_PRES # pin. This high-to-low voltage drop of one embodiment may occur as voltage at the BMU 130 is dropped to ground by the ground source 244 at the information handling system 200. The drop in voltage from a high voltage to a low voltage may cause the BMU 230 to create a voltage indicator that is indicative of this electrical coupling of the battery 226 to the information handlings system 200. This is done while the information handling system 200 is in this off state and occurs independent of any signals being sent to the battery from the information handling system 200.

In this example, the voltage indicator created by the BMU 230 may be sent to a register 240 of the BMU 230. Upon creation of the voltage indicator by the BMU 230, the BMU 230 may cause the voltage indicator to be stored, for example, within a battery register 240 (e.g., BATT_DISC register) for later retrieval by a microcontroller 232 within the chassis of the information handling system 200. In an embodiment, the voltage indicator may be stored by changing a bit within the battery register from a "0" to a "1." According to the embodiments described herein, the creation of the voltage indicator by the BMU 230 and storing the voltage indicator in the battery register 240 is done while the information handling system as the battery 226 is being recoupled electrically (and, in some embodiments, mechanically) to the information handling system 200.

In the above example embodiment, the change in voltage state at the SYS_PRES # pin may be detected as the SYS_PRES # pin is brought from a high voltage state to a low voltage state using a pull up resistor 246 when decoupled and ground connection 244 in the information handling system when the battery 226 is coupled. Alternatively, those of skill will understand that the change in voltage state at the SYS_PRES # pin may be detected as the SYS_PRES # pin is brought from a low voltage state when decoupled to a high voltage state when coupled using a pull-down resistor (not shown) that operates similarly to the pull up resistor 246. In a decoupled state of battery 226, SYS_PRES # pin may be coupled to ground via a pull down resistor and thus be in a low voltage state when decoupled. Upon coupling to information handling system 200, the SYS_PRES # pin may be coupled to an internal information handling system power source such as a coin battery cell for the RTC voltage that may exist in some models of information handling system 200. This RTC voltage in the information handling system 200 may pull SYS_PRES # pin to a high voltage and the pull down resistor may avoid the voltage being shorted to ground in the battery. In either of these embodiments, the Vcc may be used to power the BMU 230. In either embodiment, the SYS_PRES # pin may be set to any specific decoupled state voltage that changes when the SYS_PRES # pin is coupled to the information handling system to provide an indication to the BMU 230 via the SYS_PRES # pin when the state of the voltage at the SYS_PRES # pin changes.

For the embodiments where the SYS_PRES # pin is electrically coupled to ground 244 within the information handling system 200 when the battery 226 is coupled to the information handling system 200, the pull-up resistor 246 ensures a well-defined voltage (i.e. Vcc, or logical high) across the SYS_PRES # pin when not coupled to ground 244. Conversely, for embodiments where SYS_PRES # pin is connected to ground, a pull-down resistor may ensure a well-defined ground voltage (i.e. logical low) when the SYS_PRES # pin is not coupled to information handling system 200. Then, for example, when a power source within the information handling system 200 such as a cell battery associated with the real-time clock is coupled during coupling of battery 226 to information handling system 200, the SYS_PRES # pin will be pulled to a high state voltage. The present specification contemplates that other circuitry may be used to set the SYS_PRES # pin to a specific voltage and for the BMU 230 to detect a change in voltage state at the SYS_PRES # pin when the battery is either uncoupled from or coupled to the information handling system 200. The example shown in FIG. 2 is meant to be descriptive of one example of how to detect the voltage change at the SYS_PRES # pin from a first voltage state to a second voltage state and is not meant as a limitation on the scope or applicability of the systems and methods described herein.

In the embodiments described herein, as the information handling system 200 is turned on, the microcontroller 232 may access the register 240 on the BMU 230 via a system management BUS 242 to determine whether the voltage indicator is present and stored on the register 240. Where the register 240 does not indicate that a voltage indicator is present, the information handling system may continue with a boot process without taking those preset action as described herein.

Where the register 240 indicates that a voltage indicator is present, the microcontroller 232 may engage in any of the plurality of preset actions described herein. As described herein, these preset actions may include causing a warning message to be displayed on the video display 210 of the information handling system 200 indicating to a user that the battery 226 has been removed since the information handling system 200 has been placed in the off state, implementing a customized security process according to a security administrator setting, reading a serial number of the battery maintained by the BMU to confirm the authenticity of the battery, decrypting encrypted security parameters maintained by the BMU after binding a serial number associated with the battery to a binding key associated with the information handling system and accessing the security parameters, and causing all or a portion of a storage device on the information handling system 200 to be erased, among other actions. The present specification provides a number of potential present actions that may be conducted by the microcontroller 232 upon detection of the voltage indicator at the register 240 of the BMU 230. It is appreciated that any of these preset actions, either alone or in combination, may be initiated at any time by the microcontroller 232. Additionally, other preset actions, either individually or in combination with these listed preset actions, may be initiated by the microcontroller 232, upon execution of computer readable program code by the microcontroller 232, and the present specification contemplates these other preset actions being initiated without going beyond the scope of the principles described herein.

Figure 3:
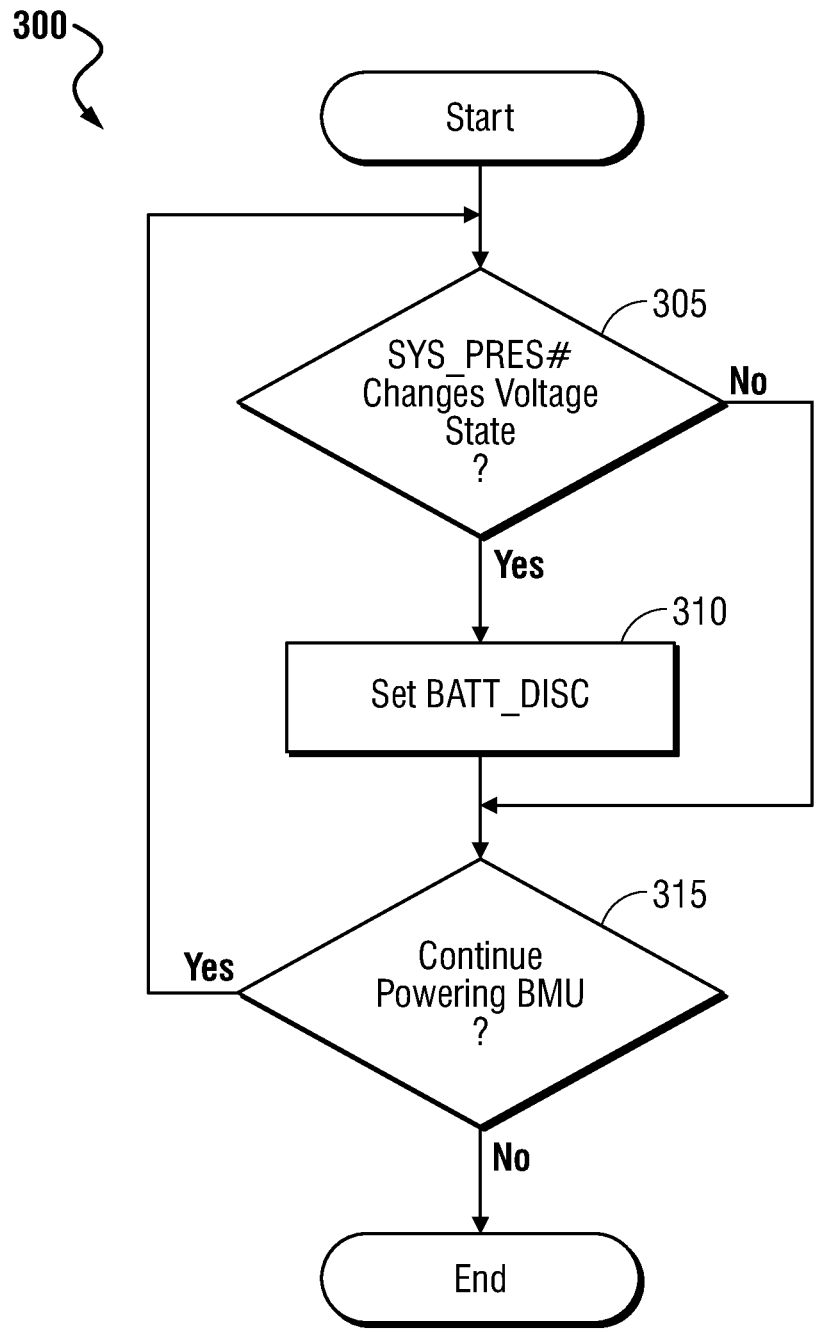
FIG. 3 is a flow diagram illustrating a method of detecting a removal of a battery from an information handling system according to an embodiment of the present disclosure.

FIG. 3 is a flow diagram illustrating a method 300 of detecting a removal of a battery from an information handling system according to an embodiment of the present disclosure. As described herein, the removal of the battery may be conducted for a number of non-nefarious or nefarious reasons. In order to prevent the resetting of the security parameters of the information handling system by resetting power to the information handling system or to prevent any other tampering of the information handling system while in an off state, the present method 300 may be conducted for example.

The method 300 may begin with, at a BMU, determining whether a voltage state transition has occurred, such as a high-to-low voltage state drop or low-to-high voltage state transition, at the system present pin (e.g., SYS_PRES # pin) has occurred at block 305. As described herein, the voltage state transition may be a high-to-low voltage drop may occur as power at the system present pin is dropped to ground by the electrical coupling of the battery to the information handling system via, for example, a ground source in one embodiment. In other embodiments, the voltage state transition may be a low-to-high voltage transition that may occur as power at the system present pin is raised from ground or a low voltage to a high voltage state by the electrical coupling of the battery to the information handling system via, for example, a power source in the information handling system in another embodiment Where voltage state transition has not been detected (NO determination, block 305) this may indicate that the battery had not been previously removed from the information handling system or, at least, not been electrically recoupled to the information handling system. During an initial decoupling of the battery from the information handling system, a voltage regulator may cause the system present pin to be set to a high voltage state in some examples or a low voltage state in other example embodiments. This may be done as the voltage regulator continuously provides power to the BMU as the battery has been removed from the information handling system. Upon determination that no change in voltage state has occurred, the method may proceed to block 315 to determine whether the BMU will be continuously powered as in block 315 or has reached a low battery power threshold level, a duration of BMU power draw, or other criteria as discussed further below. The determination of whether the BMU will be continuously power may occur iteratively and continuously along with determination of whether a change in state voltage has occurred or not occurred with block 305. In this embodiment, when no change in voltage state is detected at 305 and the BMU will be continuously powered, the process continues with the voltage regulator iteratively or continuously determining whether a voltage state transition has occurred at the system present pin via feedback to block 305 from block 315.

When the voltage transitions between voltage states, such as from this high voltage state (e.g., a voltage higher than ground) to the low voltage state or from low voltage state to a high voltage state, the BMU may detect that the battery has been electrically recoupled or coupled to the information handling system for the first time at block 305. In the present specification and in the appended claims, the recoupling of the battery to the information handling system is meant to be understood as, at least, the subsequent connection of the electrical components of the battery to the electrical components of the information handling system after the battery had been electrically decoupled from the information handling system. In the present specification and in the appended claims, the coupling of the battery to the information handling system may occur for the first time during assembly of the information handling system.

Where a change in voltage state, such as high-to-low voltage drop or low-to-high voltage state transition, has been detected (YES determination, block 305) this may indicate that the battery has been, at least, electrically recoupled to the power supply line of the information handling system. The method 300 may then proceed to block 310 where the BMU creates a voltage indicator that is indicative of this electrical coupling of the battery to the information handling system. In a specific example, the BMU may cause the voltage indicator to be stored, at block 310, within a battery register (e.g., BAT_DISC register) by, for example, changing a bit within the battery register from a "0" to a "1" or vice-versa.

As described herein, the method 300 may continue at block 315 with determining whether the BMU is to be continuously powered. As described herein, the amount of power provided to and consumed by the BMU may be sufficient to allow the BMU to be continuously powered for a number of hours while the information handling system is in this off state and/or while the battery is decoupled from the information handling system. The method 300 may, therefore, be conducted independent of any direction from a processor or microcontroller of the information handling system and is conducted while the information handling system is in an off state. This allows for additional preset actions to be taken by a microcontroller of the information handling system upon powering up of the information handling system so that the security of the data maintained on the information handling system is maintained. However, damage may occur to the battery if the cells of the battery are drained as the BMU is continuously powered for extended period of time. Further, if the battery cells of the battery lose power and are not recharged, the power source for the BMU may no longer be available. Where it is determined that the BMU should continue to be powered (YES determination, block 315), the method 300 may continue back to block 305 with iteratively or continuously determining whether a change in voltage state has occurred. Criteria that determines whether the BMU will continue to be powered on may include whether a power saving process is initiated, whether a threshold voltage from any given cell or the battery as whole drops below a threshold, whether a time limit has been exceeded, among other criteria. Where any one or a plurality of these criteria are met (NO determination, block 315), the method 300 may end.

Figure 4:
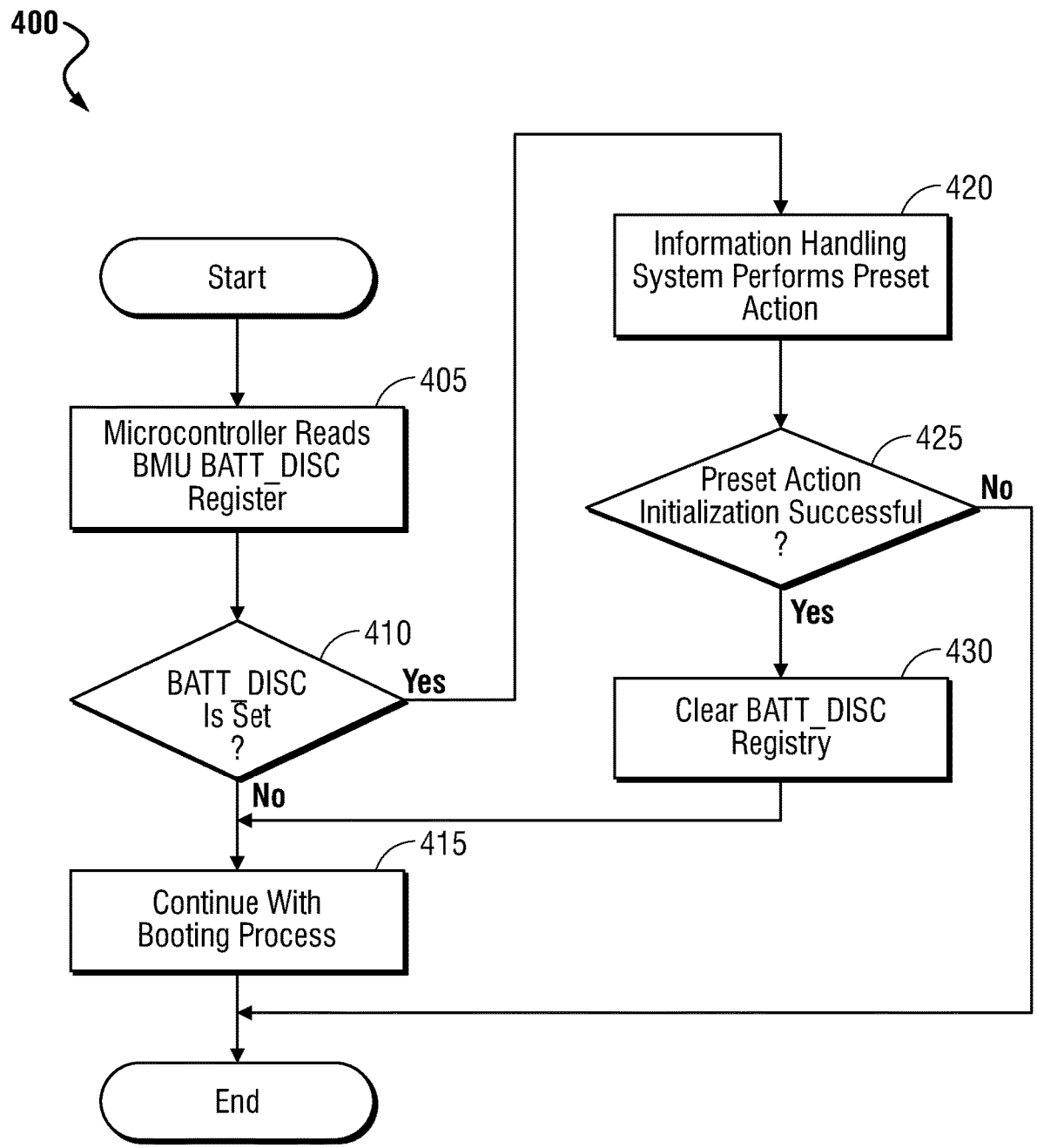
FIG. 4 is a flow diagram illustrating a method of detecting and responding to a removal of a battery from an information handling system according to another embodiment of the present disclosure.

FIG. 4 is a flow diagram illustrating a method 400 of detecting and responding to a removal of a battery from an information handling system according to an embodiment of the present disclosure. In an embodiment, the method 400 of FIG. 4 may be conducted after the method 300 of FIG. 300 is conducted and a power button is pressed on the information handling system. For example, method 400 may cause a preset action upon the detection of a voltage indicator created via method 300 described in connection with FIG. 3 when the information handling system has been turned on. These preset actions include, among others, increasing the security of the data maintained on the information handling system, increasing the security of the hardware of the information handling system, and increasing the ability to diagnose any technical issues associated with the information handling system upon power on of the information handling system. In some specific embodiments, the systems and methods described herein may detect the use of a different battery at the information handling system that may have been swapped out for a non-original equipment manufacturer (OEM) battery which may impact the operation of the information handling system. Still further, the systems and methods may deter any intrusions into the chassis by limiting access to the data on the information handling system if the battery was removed when the information handling system is off indicative of a potential intrusion into the chassis of the information handling system.

The method 400 of FIG. 4 may begin with a microcontroller reading a register (e.g., BATT_DISC register) on the BMU at block 405. In an embodiment, the microcontroller may be an embedded controller within the information handling system that forms part of a power management unit. The microcontroller may do so in order to determine, at block 410, whether a voltage indicator (e.g., BATT_DISC) is set within the register. Where the voltage indicator is not set within the register (NO determination, at block 415), the method 400 may continue with a booting process at block 415. This booting process may include initiating a BIOS by the processor of the information handling system and executing computer readable program code to initiate an OS. Because the register on the battery did not indicate that the battery had been removed and subsequently electrically recoupled to the information handling system while the information handling was in an off state, any booting processes may be allowed to continue without the initiation of any preset actions by the microcontroller prior to the booting processes.

Where the voltage indicator is found to be set within the register (YES determination, at block 415), the method 400 may continue with the information handling system, and more specifically the microcontroller, performing a preset action as described herein. As described herein, these preset actions may include causing a warning message to be displayed on the video display of the information handling system indicating to a user that the battery has been removed since the information handling system has been placed in the off state, implementing a customized security process according to a security administrator setting, reading a serial number of the battery maintained by the BMU to confirm the authenticity of the battery, decrypting encrypted security parameters maintained by the BMU after binding a serial number associated with the battery to a binding key associated with the information handling system and accessing the security parameters, or causing all or a portion of a storage device on the information handling system to be erased, among other actions.

The method 400 may continue with determining whether the initialization of the preset action has been successful at block 425. Where the initialization of the preset action has not been successful at block 425 (NO determination, block 425), the process may end. In a specific embodiment, the process may end with the system preventing any access to a user to the data maintained on the information handling system due to the lack of any credentials presented, higher security preset actions initiated, or data protection processes initiated. In other words, no booting process may be allowed to occur.

Where the initialization of the preset action has been successful at block 425 (YES determination, block 425), the method 400 may continue with the information handling system, and more specifically the microcontroller, clearing the registry at block 430. In an embodiment, the voltage indicator used to initiate the preset action in blocks 410 and 420 may be deleted by changing the stored bit within the battery register from a "1" to a "0." Other indication methods apart from changing a bit from a "0" to a "1" and from a "1" to a "0" may be used when storing and clearing the voltage indicator on the register, respectively, and the present specification contemplates these other indication methods.

Once the registry has been cleared at block 430, the method 400 may continue with the information handling system continuing with a booting process at block 415. This booting process may include initiating a BIOS by the processor of the information handling system and/or executing computer readable program code to initiate an OS. At this point, the method 400 may end.

Figure 5:
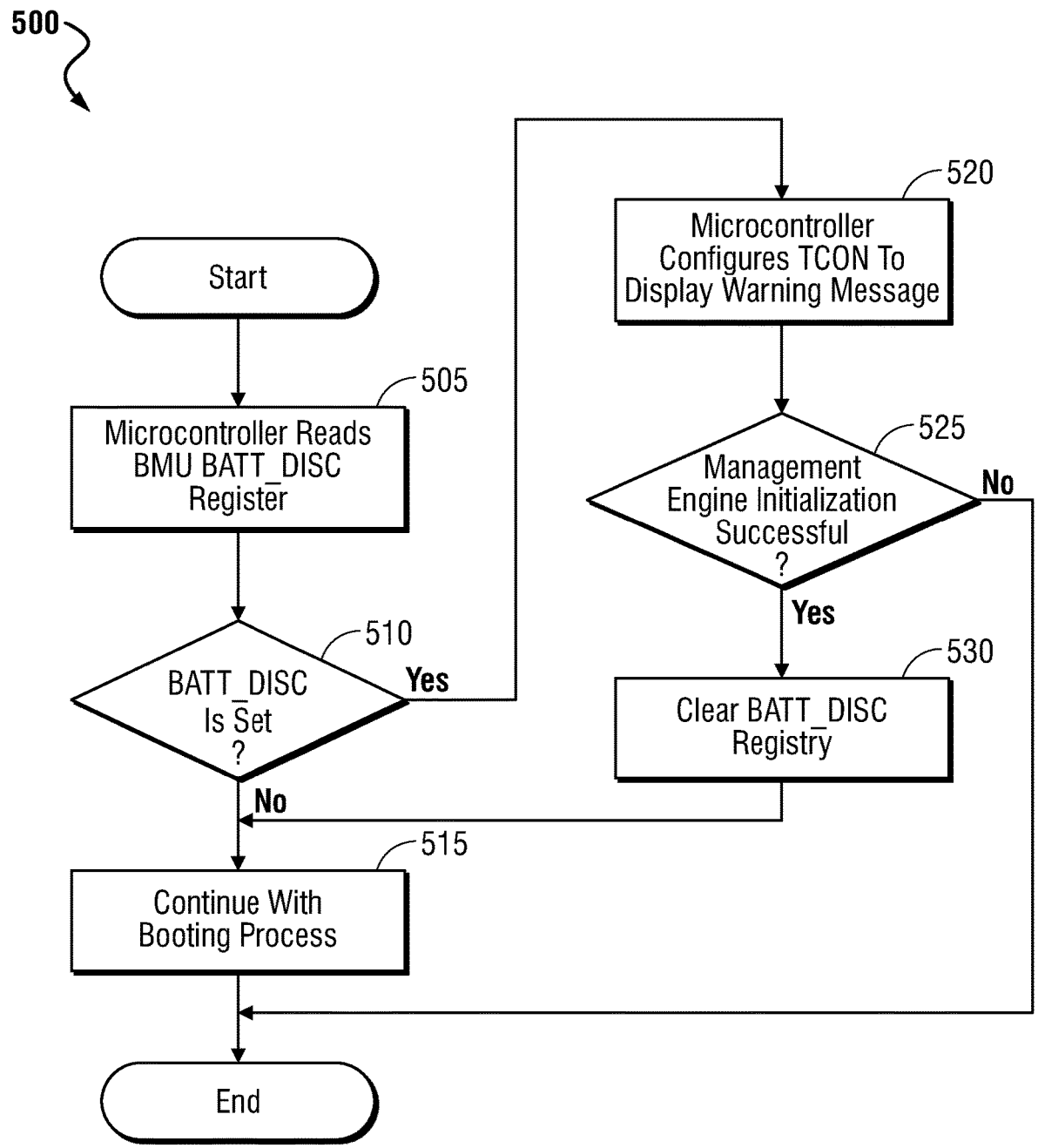
FIG. 5 is a flow diagram illustrating a method of detecting and responding to a removal of a battery from an information handling system according to yet another embodiment of the present disclosure.

FIG. 5 is a flow diagram illustrating a method 500 of detecting and responding to a removal of a battery from an information handling system according to an embodiment of the present disclosure. The method 500 may begin with a microcontroller reading a register (e.g., BATT_DISC register) on the BMU at block 505 once a power button on the information handling system has been pressed. The pressing of the power button on the information handling system may cause an initiation of a booting process. In some embodiments described herein, the booting process may be delayed until the microcontroller reads the register on the battery at block 510. The microcontroller reads the register on the battery in order to determine whether a voltage indicator (e.g., BATT_DISC) is set within the register. Where the voltage indicator is not set within the register (NO determination, at block 515), the method 500 may continue with a booting process at block 515. This booting process may include initiating a BIOS by the processor of the information handling system and executing computer readable program code to initiate an OS. Because the register on the battery did not indicate that the battery had been removed and subsequently electrically recoupled to the information handling system while the information handling was in an off state, any booting processes may be allowed to continue without the initiation of any preset actions by the microcontroller prior to the booting processes.

Where the voltage indicator is found to be set within the register (YES determination, at block 415), the method 400 may continue, in this embodiment, with the microcontroller configuring a timing controller (TCON) to display this warning message to the user of the information handling system. The warning message may be displayed to a user using, for example, a video display operatively coupled to the microcontroller of the information handling system. This warning message may be presented upon detection of the voltage indicator as described herein. This warning message may include any detail related to the consequences related to the removal of the battery 126 such as cautions related to the potential compromising of the data maintained on the information handling system 100. In an example, the warning presented to the user on the video display 110 may include instructions related to contacting their IT manager and may require some additional credentials in order to allow the boot process of a basic input/output system (BIOS) or operating system (OS) to be executed by the processor 102 of the information handling system 100.

After the microcontroller has configured the TCON to display the warning message at block 520, the method 500 may continue with determining whether an initialization of a management engine was successful at block 525. A management engine may include any computer readable program code that, when executed, initializes a background image on a video display, among other possible processes associated with initiating the OS. A management engine may be used to, according to some embodiments described herein, display a background on a video display of the information handling system and prevent any reinitializing of the image on the video display until a boot process is completed.

Where the initialization of a management engine was not successful at block 525 (NO determination, block 525), the process may end. In a specific embodiment, the process may end with the information handling system preventing any access to a user to the data maintained on the information handling system due to the lack of any credentials presented, higher security preset actions initiated, or data protection processes initiated.

Where the initialization of the preset action has been successful at block 525 (YES determination, block 525), the method 500 may continue with the information handling system, and more specifically the microcontroller, clearing the registry at block 530. In an embodiment, the voltage indicator used to initiate the preset action in blocks 510 and 520 may be deleted by changing the stored bit within the battery register from a "1" to a "0." Other indication methods apart from changing a bit from a "0" to a "1" and from a "1" to a "0" may be used when storing and clearing the voltage indicator on the register, respectively, and the present specification contemplates these other indication methods.

Once the registry has been cleared at block 530, the method 500 may continue with the information handling system continuing with a booting process at block 515. This booting process may include initiating a BIOS by the processor of the information handling system and/or executing computer readable program code to initiate an OS. At this point, the method 500 may end.

Figure 6:
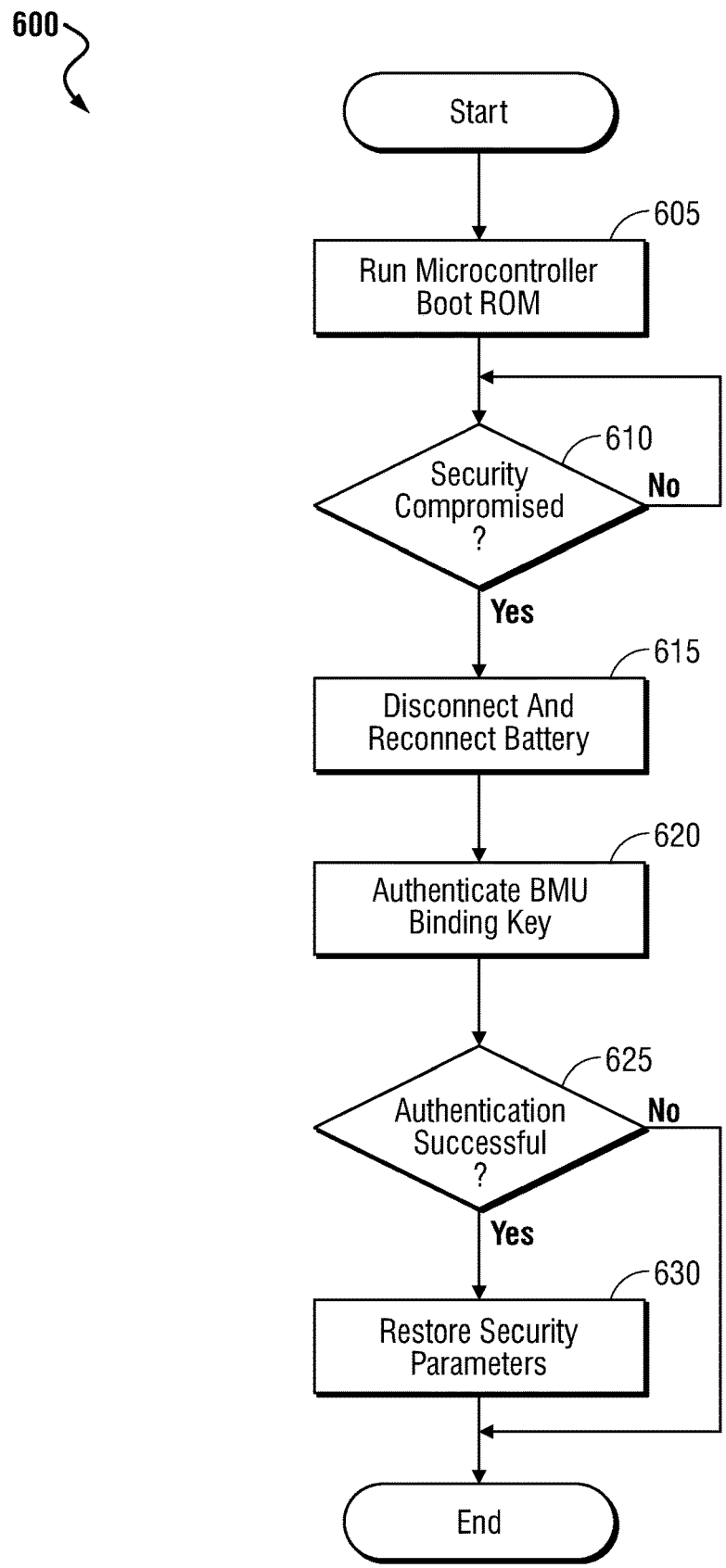
FIG. 6 is a flow diagram illustrating a method of managing information handling system security with detecting and responding to a removal of a battery from an information handling system according to an embodiment of the present disclosure.

FIG. 6 is a flow diagram illustrating a method 600 of detecting and responding to a removal of a battery from an information handling system according to an embodiment of the present disclosure. The method 600 may begin with running a boot read-only memory (ROM) at the microcontroller. The boot read-only memory (ROM) may be conducted in response to a power button being pressed at the information handling system and may be conducted prior to the booting of an OS of the information handling system. This boot ROM initialization may prompt the microcontroller to, at block 610, determine whether there exists any indication of the security of the information handling system being compromised. In an example, the security of the information handling system may be compromised when a chassis intrusion module, switch, or circuitry within the information handling system indicates that the chassis or housing of the information handling system has been opened. In an embodiment, the indication may be a signal received from a chassis intrusion circuitry present on the information handling system indicating to the microcontroller that the chassis of the information handling system was opened.

Where there is no indication of the security being compromised (NO determination, at block 610) the microcontroller may iteratively check if the security is compromised. Where there is an indication of the security being compromised (YES determination, at block 610) the microcontroller may disconnect and reconnect the battery at block 615. This disconnection and reconnection may be done by electrically decoupling the battery from a power supply line and/or system management BUS and reconnecting these to the information handling system and the microcontroller. This disconnection and reconnection may be done so as to reauthenticate the battery to make sure whether or not additional security measures should be taken in the remaining processes within the method 600.

The method 600 may continue with authenticating the BMU binding key as described herein at block 620. In an example, the BMU may include decrypting encrypted security parameters maintained by the BMU after binding a serial number associated with the battery to a binding key associated with the information handling system and accessing the security parameters. The binding of the serial number associated with the battery to the binding key may have been conducted prior to the information handling system being placed in on off state prior to the execution of the method 600 described in FIG. 6. This binding process, for example, and include setting up an encrypted version of the battery serial number and an encryption key to be maintained on the information handling system.

In some embodiments, the security parameters executed at block 620 may include computer executable program code that, when executed by the microcontroller, provides for increased security related to accessing data on the information handling system. The security parameters may include computer executable program code that, when executed by the microcontroller or processor, may implement any type of additional or supplementary security measures above those that may be conducted by the information handling system during, for example, a booting process of the BIOS or OS. For example, this may include a request for a secondary secured password from an IT support manager. When the secondary secured password is provided, the method 600 may continue. In another example, alternative passcodes, passphrases, or other digital or biometric authentication methods may be used and the present specification contemplates the use of these other authentication methods at block 620.

The method 600 may include, at block 625, with determining whether the authentication of the BMU binding key was successful at block 625. Where the authentication at block 620 is successful (YES determination at block 625), the method 600 may continue with restoring security parameters at block 630. As described herein, the security parameters are decrypted and used to implement any type of additional or supplementary security measures above those that may be conducted by the information handling system during, for example, a booting process of the BIOS or OS. At this time, the method 600 may end.

Where the authentication at block 620 is not successful (NO determination at block 625), the method 600 may end here. In a specific embodiment, the process may end with the system preventing any access to a user to the data maintained on the information handling system due to the lack of any credentials presented, higher security preset actions initiated, or data protection processes initiated. In an example, no boot process may occur or be allowed to occur and no restoration of credentials may be conducted.

Figure 7:
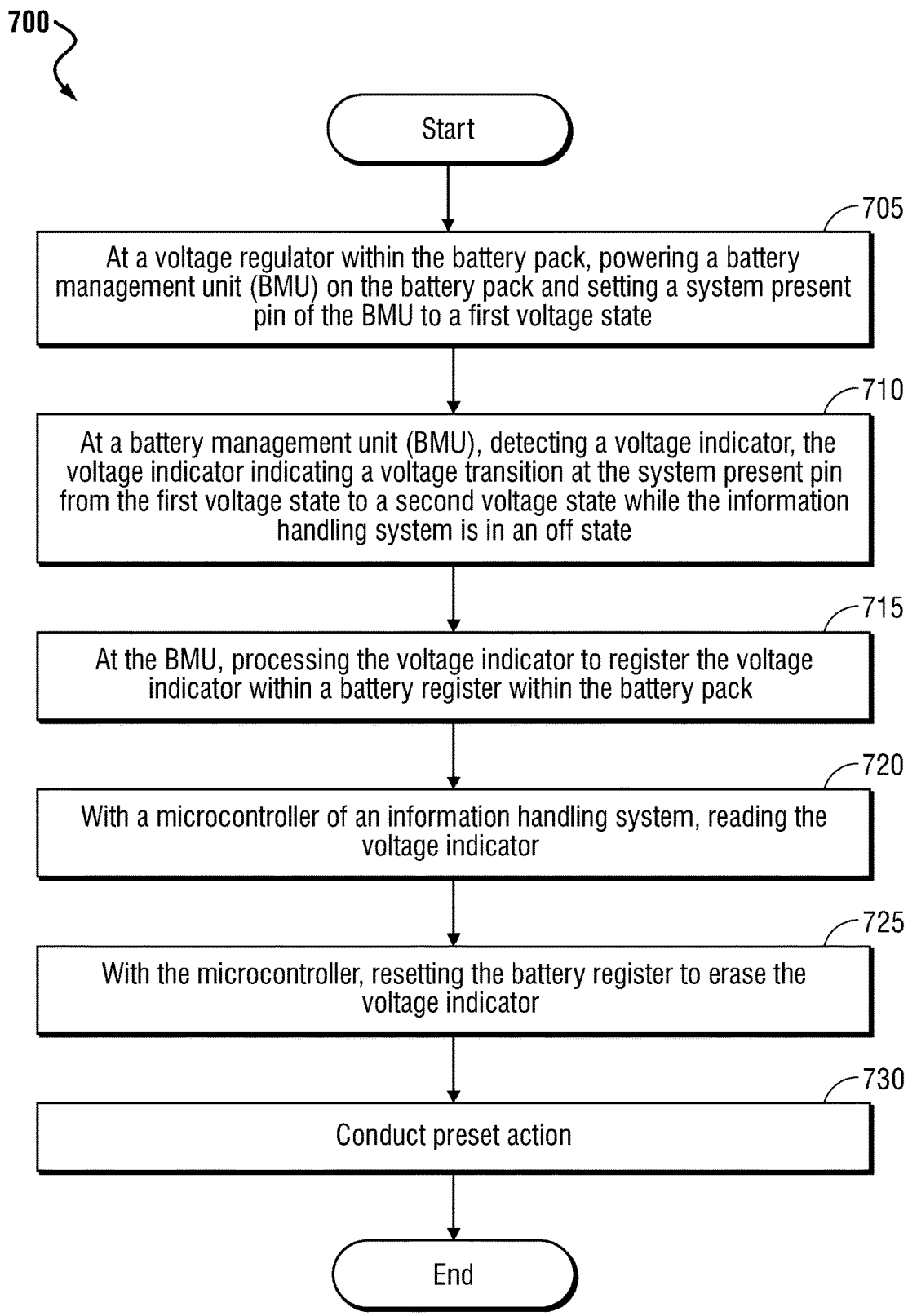
FIG. 7 is a flow diagram illustrating a method of detecting a removal of a battery pack according to an embodiment of the present disclosure.

FIG. 7 is a flow diagram illustrating a method 700 of detecting a removal of a battery pack according to an embodiment of the present disclosure. The method 700 described may be used to determine when certain preset actions should be conducted in response to the detection of the battery being removed. These preset actions may increase the security of the data maintained on the information handling system, increase the security of the hardware of the information handling system, and increase the ability to diagnose any technical issues associated with the information handling system upon power on of the information handling system. In some specific embodiments, the method 700 described herein may detect the use of a different battery at the information handling system that may have been swapped out for a non-original equipment manufacturer (OEM) battery which may impact the operation of the information handling system. Still further, the method 700 may deter any intrusions into the chassis by limiting access to the data on the information handling system if the battery was removed when the information handling system is off indicative of a potential intrusion into the chassis of the information handling system.

The method 700 may begin with, at a voltage regulator within a battery pack, powering a battery management unit (BMU) on the battery pack and setting a system present pin of the BMU to a high voltage at block 705. As described herein, the method 700 is conducted while the information handling system is in an off state and/or while the battery has been removed from the information handling system. By setting the system present pin to a high voltage state, the method 700 may be used to detect a subsequent low voltage state of the system present pin of the BMU when the system present pin is electrically coupled to a grounding source within the information handling system. This electrical coupling of the system present pin to the grounding source may be completed, in some examples, upon a mechanical coupling (or recoupling) of the battery to the information handling system.

The method 700 may continue with detecting a voltage indicator, the voltage indicator indicating a high-to-low voltage drop at the system present pin to a grounding line of an information handling system during an electrical coupling of the battery to the information handling system while the information handling system is in an off state at block 710. In a specific embodiment, the BMU may detect the voltage indicator indicating a high-to-low voltage drop at system present pin (e.g., SYS_PRES #) of the BMU that is externally connectable to a ground at the information handling system.

The method 700 may continue with, at a BMU, processing the voltage indicator to register the voltage indicator within a battery register within the battery pack at block 715. In an embodiment, the voltage indicator may be stored by changing a bit within the battery register from a "0" to a "1." Other indication methods apart from changing a bit from a "0" to a "1" and from a "1" to a "0" may be used when storing and clearing the voltage indicator on the register, respectively, and the present specification contemplates these other indication methods.

The method 700 may further include, with a microcontroller of an information handling system, reading the voltage indicator and resetting the battery register to erase the voltage indicator at block 720. As described herein, if and when the voltage indicator is discovered to exist on the battery register, the microcontroller may initiate certain preset actions, at block 730, in order to protect the information handling system and the data maintained thereon. By initiating these preset actions described herein, the user may be assured that the removal of the battery from the information handling system, while the information handling system was in an off state, was not done to, for example, circumvent any chassis intrusion detection devices or circuits while the power was off at that information handling system or that the security of the information handling system has been compromised. As described herein, these preset actions may include causing a warning message to be displayed on the video display of the information handling system indicating to a user that the battery has been removed since the information handling system has been placed in the off state, implementing a customized security process according to a security administrator setting, reading a serial number of the battery maintained by the BMU to confirm the authenticity of the battery, decrypting encrypted security parameters maintained by the BMU after binding a serial number associated with the battery to a binding key associated with the information handling system and accessing the security parameters, and causing all or a portion of a storage device on the information handling system to be erased, among other actions.

The present specification provides a number of potential present actions that may be conducted by the microcontroller upon detection of the voltage indicator at the register of the BMU. It is appreciated that any of these preset actions, either alone or in combination, may be initiated at any time by the microcontroller. Additionally, other preset actions, either individually or in combination with these listed preset actions, may be initiated by the microcontroller, upon execution of computer readable program code by the microcontroller, and the present specification contemplates these other preset actions being initiated without going beyond the scope of the principles described herein.

The blocks of the flow diagrams of FIGS. 3 through 7 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system, comprising:
a processor;
a battery to supply power to the information handling system, the battery comprising a voltage regulator to power a battery management unit (BMU) on the battery and set a system present pin of the BMU to a first voltage state;
the BMU to:
detect a voltage indicator indicating a change in the first voltage state at the system present pin of the BMU that is externally connectable to a ground or voltage source at the information handling system, the voltage indicator indicative of an electrical coupling of the battery to the information handling system; and
register the voltage indicator indication of the change in the first voltage state within a battery register of the BMU;
a microcontroller, upon powering on of the information handling system, to read the voltage indicator at the battery register and determine that the voltage indicator indicates the change in the first voltage state and perform a preset action on the information handling system, wherein the preset action includes a customized security process according to a security administrator setting; and
the microcontroller to clear the battery register of the BMU of the indication of the change in the first voltage state upon completion of the preset action and continuing with a boot process of the information handling system.

2. The information handling system of claim 1, wherein the microcontroller, upon reading the voltage indicator, executes a portion of the preset action to be display a warning message on a display device of the information handling system indicating to a user that the battery has been removed since the information handling system has been placed in the off state.

3. The information handling system of claim 1, wherein the microcontroller, upon reading the voltage indicator, executes a portion of the preset action as an increase in security requirements at the information handling system in order to limit access to contents of a system drive on the information handling system.

4. The information handling system of claim 1, wherein upon sending the voltage indicator indicating the voltage transition at the system present pin from the first voltage state to the second voltage state to the microcontroller causes a remote confirmation request to be sent to an IT administrator as a portion of the preset action.

5. The information handling system of claim 1, wherein the microcontroller executes a portion of the preset action to read a serial number of the battery maintained by the BMU to confirm the authenticity of the battery.

6. The information handling system of claim 1, wherein the microcontroller executes a portion of the preset action to decrypt encrypted security parameters maintained by the BMU after binding a serial number associated with the battery to a binding key associated with the information handling system and accessing the security parameters.

7. The information handling system of claim 1, wherein the microcontroller erases the voltage indicator at the battery register of the indication of the change in the first voltage state after determining that the battery has been coupled to the information handling system.

8. A battery pack of an information handling system, comprising:
a voltage regulator to power a battery management unit (BMU) on the battery;
the BMU including a system present pin, the BMU configured to:
detect a voltage state at the system present pin;
detect a voltage indicator, the voltage indicator indicating a change in the voltage state at the system present pin during an electrical coupling of the battery to the information handling system;
register the voltage indicator indicating the change in the voltage state at the system present pin within a battery register; and
the voltage indicator at the battery register to transmit to a microcontroller, upon powering on of the information handling system, that the voltage indicator indicates the change in the voltage state to trigger a preset action on the information handling system, and the microcontroller to clear the battery register of the BMU of the indication of the change in the voltage state upon completion of the preset action and continuing with a boot process of the information handling system,
wherein the present action includes displaying a warning message on a display device of the information handling system indicating to a user that the battery has been removed since the information handling system has been placed in the off state.

9. The battery pack of claim 8, wherein the BMU includes a memory to maintain a battery pack serial number to be read by the microcontroller of the information handling system to confirm the authenticity of the battery pack during a portion of the preset action.

10. The battery pack of claim 9, wherein the BMU includes a memory to maintain an encrypted serial number and security parameters to be read by the microcontroller of the information handling system upon detection of an encryption key received from the microcontroller at the BMU during a portion of the preset action.

11. The battery pack of claim 9, wherein the BMU received a command from the microcontroller to reset the battery register indicating the change in voltage state created by the voltage at the system present pin being pulled to ground.

12. A method of detecting a removal of a battery pack from an information handling system, comprising:
powering a battery management unit (BMU) via a voltage regulator within the battery pack and setting a system present pin of the BMU to a first voltage state;
at the BMU:
detecting a voltage indicator, the voltage indicator indicating a voltage transition at the system present pin from the first voltage state to a second voltage state while the information handling system is in an off state;
processing the voltage indicator to register the voltage indicator indicating the voltage transition at the system present pin from the first voltage state to the second voltage state and storing the indication of the voltage transition at the system present pin within a battery register within the battery pack;
sending the indication of the voltage transition at the system present pin to a microcontroller of the information handling system;
executing, via the microcontroller, a preset action for the information handling system before proceeding with boot up of the information handling system, wherein the present action includes displaying a warning message on a display device of the information handling system indicating to a user that the battery has been removed since the information handling system has been placed in the off state; and
receiving an instruction from the microcontroller to reset the battery register to erase the voltage indicator indicating the voltage transition at the system present pin from the first voltage state to the second voltage state upon execution of the preset action.

13. The method of claim 12, wherein the microcontroller erases the voltage indicator at the battery register of the indication of the change in the first voltage state after determining that the battery that has been coupled to the information handling system is authorized.

14. The method of claim 12, wherein upon sending the voltage indicator indicating the voltage transition at the system present pin from the first voltage state to the second voltage state to the microcontroller causes a portion of the preset action to be an increase in security requirements at the information handling system in order to limit access to contents of a system drive on the information handling system.

15. The method of claim 12, wherein upon sending the voltage indicator indicating the voltage transition at the system present pin from the first voltage state to the second voltage state to the microcontroller causes a portion of the preset action to be an implementation of a customized security process according to a security administrator setting.

16. The method of claim 12, wherein the BMU sends a serial number of the battery maintained by the BMU to the microcontroller as a portion of the preset action to confirm the authenticity of the battery.

17. The method of claim 12, wherein the BMU sends an encrypted serial number of the battery maintained by the BMU to be associated with a binding key and to send to the microcontroller encrypted security parameters maintained by the BMU to be decrypted and accessed as a portion of the preset action.

18. The method of claim 12, wherein upon sending the voltage indicator indicating the voltage transition at the system present pin from the first voltage state to the second voltage state to the microcontroller causes a portion of storage device within the information handling system to be erased as a portion of the preset action.

19. The method of claim 12, wherein upon sending the voltage indicator indicating the voltage transition at the system present pin from the first voltage state to the second voltage state to the microcontroller causes a remote confirmation request to be sent to an IT administrator as a portion of the preset action.

20. The method of claim 12, wherein upon sending the voltage indicator indicating the voltage transition at the system present pin from the first voltage state to the second voltage state to the microcontroller, the microcontroller intercepts signals from a management engine to display a background on a video display of the information handling system and prevents any reinitializing of the image on the video display until a boot process is completed as a portion of the preset action.

* * * * *